United States Patent
Wang (10) Patent No.: US 10,193,804 B2
(45) Date of Patent: Jan. 29, 2019

(54) METHOD OF FORWARDING DATA PACKETS, METHOD OF CREATING MERGED FIB KEY ENTRY AND METHOD OF CREATING A SEARCH KEY

(71) Applicant: Zixiong Wang, Ottawa (CA)

(72) Inventor: Zixiong Wang, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/183,312

(22) Filed: Jun. 15, 2016

(65) Prior Publication Data

US 2017/0366457 A1  Dec. 21, 2017

(51) Int. Cl.
*H04L 12/747* (2013.01)
*H04L 12/741* (2013.01)

(52) U.S. Cl.
CPC .......... *H04L 45/742* (2013.01); *H04L 45/745* (2013.01)

(58) Field of Classification Search
CPC ............................ H04L 45/742; H04L 45/745
See application file for complete search history.

(56) References Cited

U.S. PATENT DOCUMENTS

| | | | | |
|---|---|---|---|---|
| 7,095,740 B1* | 8/2006 | Jagannath | ........... | H04L 12/4641 370/392 |
| 7,715,380 B2* | 5/2010 | Somasundaram | .. | H04L 12/4675 370/389 |
| 2007/0192303 A1* | 8/2007 | Stojancic | ............. | G11C 7/1006 |
| 2007/0248091 A1* | 10/2007 | Khalid | ................ | H04L 63/0272 370/392 |
| 2007/0268885 A1* | 11/2007 | Ford | ........................ | H04L 45/00 370/351 |
| 2015/0139035 A1* | 5/2015 | Jain | ..................... | H04L 41/0816 370/255 |
| 2015/0146726 A1* | 5/2015 | Zhao | ...................... | H04L 45/745 370/392 |
| 2016/0234106 A1* | 8/2016 | Li | ............................ | H04L 45/02 |
| 2016/0350144 A1* | 12/2016 | Lu | ........................ | G06F 9/45558 |

FOREIGN PATENT DOCUMENTS

| CN | 103491006 A | 1/2014 |
|---|---|---|
| CN | 104104534 A | 10/2014 |
| CN | 105379227 A | 3/2016 |

OTHER PUBLICATIONS

Eatherton, Will, Varghese, George, et Dittia, Zubin. Tree bitmap: hardware/software IP lookups with incremental updates. ACM SIGCOMM Computer Communication Review, 2004, vol. 34, No. 2, p. 97-122.

\* cited by examiner

*Primary Examiner* — Brian D Nguyen
(74) *Attorney, Agent, or Firm* — Norton Rose Fulbright Canada LLP; Niall Cooney (57) ABSTRACT

The method of creating a key entry includes inserting a routing instance identifier (RII) after at least a portion of a key entry of a routing instance (RI) FIB, in accordance with an encoding scheme. In other words, at least a portion of bits of the RI FIB key entry is located before bit(s) of the RII in the resulting, merged FIB key entry. Depending on the encoding scheme, the RII can be inserted at the end of the RI FIB key entry, or at an intermediary location within the RI FIB key entry (after a given number of bits). To form the merged FIB, the method is repeated multiple times on corresponding key entries of the RI FIB. There is also provided a method of creating a search key to lookup the merged FIB.

16 Claims, 11 Drawing Sheets

METHOD OF FORWARDING DATA PACKETS, METHOD OF CREATING MERGED FIB KEY ENTRY AND METHOD OF CREATING A SEARCH KEY

FIELD

The improvements generally relate to methods and devices for forwarding data packets either within or between networks, and more specifically addresses the routing efficiency/transfer speed of nodes having more than one co-existing routing instance, such as can occur in the context of network virtualization.

BACKGROUND

The reliable transfer of data between devices within and across networks is a key requirement for today's technology. Examples of networks can range from end-user networks (e.g. home or company local area networks (LANs)) to higher-tier instances (e.g. core network). The communication between devices from different manufacturers is governed by standards and protocols. The Internet Protocol (IP), for instance, specifies the format of the addresses for devices to be enabled for communication over the Internet.

A network switch is a network node that connects devices together on a network, via individual ports, by using packet switching to receive, process and forward data to the destination port. Unlike less advanced network hubs, a network switch forwards data to one port (unicast) or to selected ones of the ports (multicast), rather than broadcasting the same data out of each of its ports.

The basic principle behind the switching function is to direct received data packets to the correct destinations, and more practically, to correct output ports. To do this, network nodes use a forwarding information bases (FIBs), tables which are used to associate destination addresses of data packets to be routed to corresponding output ports. The routing instance reads the destination address, which is included within the data packet under IP, looks up the FIB to find the corresponding routing data (e.g. output port), and then sends the data packet in the right direction or along the right link. A FIB is commonly used in network switching, and more sophisticated interfacing (e.g. bridging, routing, etc.).

The FIB can be in the form of a table which are looked up via key entries thereof. The key entries can be complete addresses, which are sometimes referred to as host routes. In the table, each key entry is associated to the routing information. The routing information for a given address is looked up via the associated key entry.

The transfer speed (bitrate) achievable by a given routing instance is strongly dependent upon the lookup speed, and many efforts have been made to improve lookup speed. For instance, it is common for a plurality of addresses having the same prefix to be associated to the same output port, in which case the FIB can include key entries in the form of one or more prefixes each leading to the routing data of multiple addresses, rather than listing the multiple addresses individually. This can shorten the FIB, and improve lookup time.

Some addresses share the same prefix as a given aggregate of other addresses, but cannot be grouped within the aggregate as they do not share the same output port. Such 'exceptions' are typically dealt with in FIBs by storing the exception addresses in the form of longer prefixes. Ultimately, a prefix can have the length of a complete address. A longest prefix match (LPM) algorithm can be used for the lookup. The LPM algorithm looks up the FIB for a match and, if more than one match is found (e.g. a shorter prefix and a longer prefix beginning with the same 'root' as the shorter prefix), selects the output port of the longest matching prefix.

In the past, various FIB schemes, and associated lookup algorithms have been developed in an effort to optimize transfer speed. For a given application, the solution ultimately retained by the designer, or later programmed in a given device, can depend on very practical factors. Indeed, such factors can include not only the intended function of the routing instance (type and quantity of data to be directed, number of output ports, etc.), but also factors such as the processor speed, the exact memory architecture (e.g. speed grade type(s) and corresponding quantity(ies) of memory cells). Indeed, there is often a motivation to downsize the FIB in order to allow storing it into higher-grade memory. Higher-grade memory is typically more expensive and more limited in quantity than lower-grade memory, but can be accessed in a faster manner by the processor.

Many LANs have only a single router provided in the form of a computer with a specialized design adapted to its specific purpose. It is quite typical for higher-tier networks or wide area networks (WANs) to have a plurality of physical routing devices (e.g. traditional routers, network switches) in a plurality of physical locations. Recent years have seen the development of network virtualization and key virtual network technologies such as virtual routers (VRs) and virtual private networks (VPNs) have emerged. Virtual networks often co-exist with and partially overlap one or more 'physical' network, and/or other virtual networks. Accordingly, more than one independent routing instance can coexist within a given routing device.

When more than one virtual router co-exist in a single physical routing device, they can compete for device resources, which can limit the transfer speed of each individual routing instance. For instance, each routing instance has a respective FIB stored in the device's memory.

When coexisting virtual routing functions are solicited for data packet routing simultaneously, one possibility would be to perform the virtual routing functions independently, in a sequential, alternating manner, with the processor accessing the corresponding FIB at each step of the sequence.

In at least some applications, a better overall transfer speed has been achieved by merging the FIBs of one or more coexisting routing instances into a single, merged FIB. Indeed, while the resulting merged FIB can represent more bits than a single one of the unmerged FIB's, an efficiency gain can nonetheless be achieved given the fact that only one (rather than more than one) FIB requires lookup.

Although various known schemes to deal with multiple routing instances on a single device have been satisfactory to a certain degree, there remains room for improvement.

SUMMARY

There is provided a method of creating a key entry of a merged FIB. The method includes inserting a routing instance identifier (RII) after at least a portion of a key entry of a RI FIB, in accordance with an encoding scheme. In other words, at least a portion of bits of the RI FIB key entry is located before bit(s) of the RII in the resulting, merged FIB key entry. Depending on the encoding scheme, the RII can be inserted at the end of the RI FIB key entry, or at an intermediary location within the RI FIB key entry (after a given number of bits). To form the merged FIB, the method is repeated multiple times on corresponding key entries of the RI FIB. There is also provided a method of creating a search key to lookup the merged FIB. The search key is created by inserting the corresponding RII after at least a portion of the address of the data packet to be routed, in accordance with the encoding scheme. Such encoding can be useful to find key entries in merged FIBs efficiently. The merged FIB lookup can be used in the context of forwarding a data packet in accordance with a destination address. The addressing format (e.g. IPv4, IPv6, etc.) can vary depending on the application.

In accordance with one aspect, there is provided a method of creating a key entry of a merged FIB. At least two routing instances (RI) are provided on a network node. Each RI has a corresponding RI FIB with corresponding RI FIB key entries and a corresponding routing instance identifier (RII). A corresponding RII is inserted after at least a portion of a corresponding RI FIB key entry.

The RII can be inserted at the end of the corresponding RI FIB key entry.

The RII can be inserted between two portions of the corresponding RI FIB key entry.

The step of inserting can be repeated on all the RI FIB key entries to create other merged FIB key entries. The merged FIB can be created using all the merged FIB key entries.

A common root can be identified in a plurality of the RI FIB key entries, in which case the merged FIB key entries can have the corresponding RII immediately after the common root of the corresponding RI FIB key entries.

A value of the common root can be stored in a memory.

A search key can be created by inserting the corresponding routing instance identifier in the destination address of the data packet to be routed after a number of bits corresponding to the value of the common root.

In accordance with another aspect, there is provided a method of creating a search key. At least two routing instances (RI) can be provided on a network node sharing a merged FIB having key entries. Each RI can have a corresponding routing instance identifier (RII). The key entries of the merged FIB can each include a corresponding one of the RIIs. A corresponding RII can be inserted after at least a portion of a destination address of a data packet to be routed by the network node.

The RII can be inserted at the end of the destination address.

The RII can be inserted between two portions of the destination address.

A value of a common root can be retrieved from a memory. The RII can be inserted after a number of bits of the destination address corresponding to the value of the common root.

In accordance with another aspect, there is provided a method of forwarding a data packet with a network node having at least two routing instances (RIs) sharing a merged FIB. The merged FIB has key entries provided in a format including a routing instance identifier (RII) after at least a portion of a data packet address, in accordance with an encoding scheme. The data packet is received, a destination address is read. The search key is created by inserting a corresponding RII after at least a portion of the destination address, in accordance with the encoding scheme. An output port for the data packet can be selected by looking up the merged FIB using the search key. The data packet can then be forwarded via the selected output port.

At least one common root of a plurality of key entries of FIBs of the routing instances can be identified and stored in the memory. The step of creating the search key can include reading the value of the common root in the memory, and inserting the RII after a number of bits of the destination address corresponding to the value of the common root.

The step of looking up the merged FIB can include performing a multibit trie algorithm.

In an embodiment, any one of the methods referred to above can be computer-implemented, i.e. implemented by a computer having a processor and a memory accessible to the processor. The initial key and the encoded key can be stored in the memory. The encoded key can be created using the processor A value of the common root can be stored in the memory.

In accordance with another aspect, there is provided a computer comprising at least two routing instances for forwarding data packets received by the computer and a memory. The data packets can have a destination address provided in the form of a destination address format. The destination address can be an IPv4 destination address. The destination address can be an IPv6 destination address.

The memory can have a merged FIB including a plurality of key entries, with each of the key entries having a corresponding routing instance identifier after at least a portion of the destination address format in accordance with an encoding scheme. The computer can further have a processor configured, for each received data packet, i) to create a corresponding search key by inserting the routing instance identifier after at least a portion of the destination address of a received data packet based on the encoding scheme, ii) to select an output port for the data packet including looking up the key entries of the merged FIB using the search key, and iii) to forward the data packet to the selected output port.

The looking up of the key entries of the merged FIB can be performed based on a multibit trie algorithm.

The encoding scheme can be based on a determination of a value of a common root of key entries of FIBs of corresponding ones of the routing instances. The memory can further have a value of the common root. The creation of the corresponding search key can include looking up the value of the common root and inserting the routing instance identifier after a number of bits of the destination address corresponding to the value of the common root.

The computer can form part of a data center switch.

It will be understood that the expression 'computer' as used herein is not to be interpreted in a limiting manner. It is rather used in a broad sense to generally refer to the combination of some form of one or more processing unit(s) and some form of memory system accessible by the processing unit(s). A computer can be a network node, a personal computer, a smart phone, an appliance computer, etc.

It will be understood that the various functions of the computer, or more specifically those executed by the processor(s), can be performed by hardware, by software, or by a combination of both. For example, hardware can include logic gates included as part of a silicon chip of the processor. Software can be in the form of programmable instructions stored in the memory system. With respect to a computer, a processing unit, a controller, or a processor chip, the expression "configured to" relates to the presence of hardware, software, or a combination of hardware and software which allows the execution of the associated functions.

A network node is a physically independent device in a network such as a switch, router, access point, server, client, other type of computer, etc.

It will be understood that routing instances can coexist on various forms of network nodes. In other texts, a distinction can be made between network nodes used in routing (or switching) data packets to hosts within a network and network nodes which route data packets from one network to another, the former being referred to as network switches and the latter being referred to as routers. In this specification, the distinction between routers and switches is not made; both the expressions network switch and router will be used with a broader meaning. For instance, the expressions 'routing instance', 'routing device' and 'router' will be used as encompassing network switches as well as traditional routers.

Many further features and combinations thereof concerning the present improvements will appear to those skilled in the art following a reading of the instant disclosure.

DESCRIPTION OF THE FIGURES

In the figures.

DETAILED DESCRIPTION

Figure 1A:
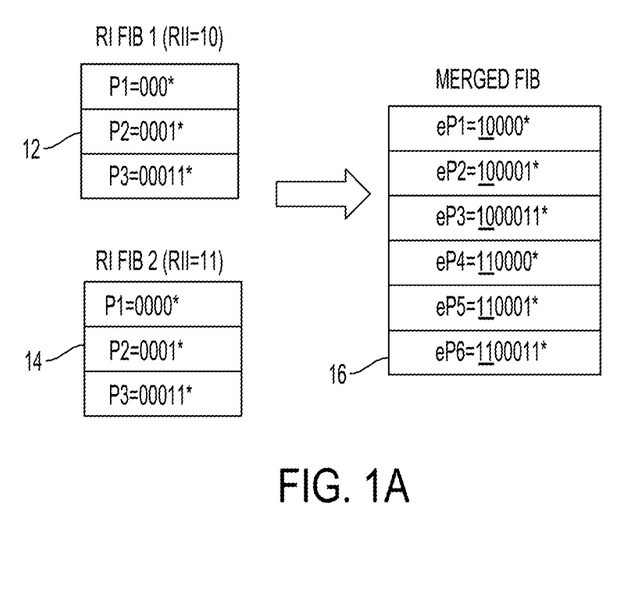
FIG. 1A is a graphical representation of an example method of forming of key entries of a merged FIB.

As presented above, a single device can have more than one co-existing routing instance. Typically, each routing instance (RI) has a corresponding forwarding information base (FIB), which will be referred to herein as the corresponding RI FIB. FIG. 1A shows a simplified example of two RI FIBs 12, 14. Each RI FIB 12, 14 has a number of key entries (labeled P1-P3). In fact, FIG. 1A shows only the key entries of these FIBs 12, 14; the other field(s) of the FIBs 12, 14 such as next hop field, etc., are not shown for further simplicity of illustration. The key entries are used to access the other field(s), and include at least a portion of an IP address (e.g. a prefix having the common most significant bits of a group of IP addresses or a full IP address).

Each co-existing RI is attributed a routing instance identifier (RII). The RII can be a virtual network identifier (VNI) or a virtual router identifier (VRI) followed by a VNI, for instance, depending on the specific routing instances co-existing on a given device. The key entries of the merged FIB 16 are created by inserting the routing instance identifier (RII) into the key entries of the corresponding RI FIBs 12, 14. More specifically, prefixes P1-P3 in RI FIB 12 are extended by prepending two binary bits 10 and become prefixes eP1-eP3, respectively, in the merged FIB 16. Similarly, prefixes P1-P3 in RI FIB 14 are extended by prepending two binary bits 11 and become prefixes eP4-eP6, respectively, in the merged FIB 16. All the resulting rows of the encoded RI FIBs (encoded key entries and associated data) are then amalgamated into a merged FIB 16. The encoding of the key entries of the RI FIBs 12, 14 is performed in accordance with an encoding scheme. In this example encoding scheme, the RII is inserted at the beginning of the RI FIB 12, 14 initial/original key entries, and the RI FIB 12, 14 initial key entries extend after the corresponding RII in the corresponding key entry of the resulting merged FIB 16.

The example shown has been simplified for ease of explanation. For instance, an artificial IP address length of 8 bits is used, whereas IPv4 specifies 32 bits and IPv6 specifies 128 bits. Moreover, in a given embodiment, the number of key entries can vary from one FIB to another, the number of FIBs can vary, and the total length of RII can be of another value than 2 bits. FIBs can be divided into one or multiple private address spaces, and each private address space can have one or more common roots with the same or different length. It will be understood that the teachings of this specification can be applied to alternate embodiments where the address formats are IPv4 or IPv6 address formats, or other formats, and in applications requiring a different number of bits than 2 for the RII. Devices having more than one co-existing routing instance can be embodied in various forms of network nodes, such as routers, network switches, and even personal computers, tablets or smartphones.

Figure 2:
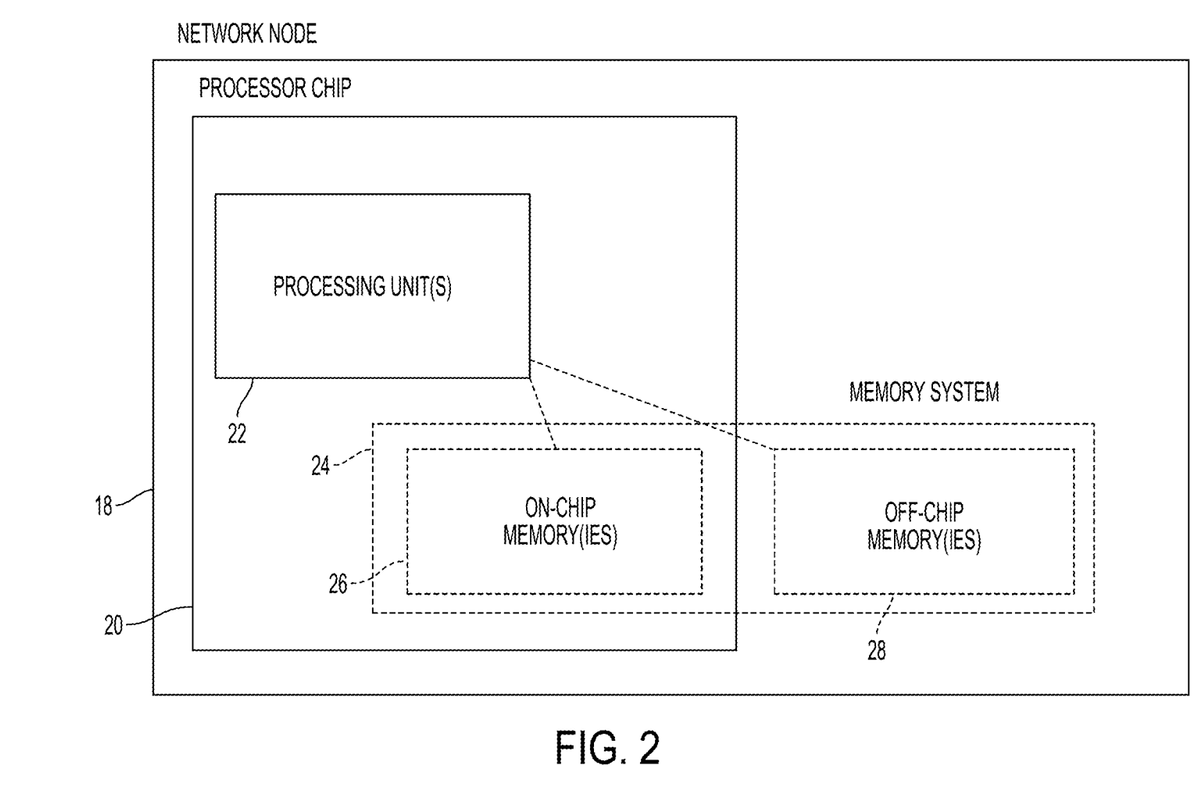
FIG. 2 is a block diagram showing a network node which can be enabled to perform the methods of FIG. 1A and FIG. 1B.

FIG. 2 shows a simplified network node 18 which can have two or more co-existing routing instances. This network node has one processor chip 20 housing one or more processing units 22 connected to a memory system 24. The memory system 24 can have on-chip memory 26 housed within the processor chip 20 and off-chip memory 28. Typically, on-chip memory 26 is much more limited than off-chip memory 28, but can be significantly faster. Typically, network nodes also have additional forms of computer-readable memory, e.g. a hard drive, which can store larger data sets such as heavier software code. The routing instances can be virtually embodied in the network node 18 by software, for instance. In highly specialized network nodes, some of the functions performed by the routing instances, such as the lookup function, for instance, can be partially or fully integrated as part of the processing unit(s) 22.

For each data packet received by the network node 18, the network node 18 can look up the merged FIB 16 using a single algorithm, independently of the routing instance responsible for the current data packet. More specifically, a search key 32 is created by encoding the destination address 30 of a received data packet in accordance with the encoding scheme. In the example encoding scheme presented in FIG. 1A and FIG. 1B, the search key 32 is created by inserting the corresponding RII at the beginning of the destination address 30 which was read in the received data packet. The search key 32 is compared to the key entries of the merged FIB 16 to find a match, and the data packet is sent through the output interface associated to the matched key entry in the merged FIB. Various algorithms can be used to perform the lookup function, and a selection can be made depending on the specificities of a given application.

Figure 1B:
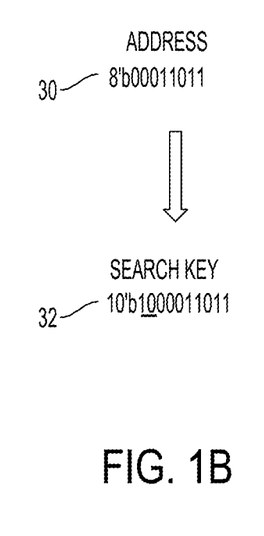
FIG. 1B is a graphical representation an example method of forming a search key to lookup the merged FIB of FIG. 1A.

It was found that the encoding scheme presented in FIGS. 1A and 1B, while satisfactory to a certain extent, resulted in limited speed at least in some applications, and that in such applications, greater speed could be achieved by using a different encoding scheme.

Figure 3A:
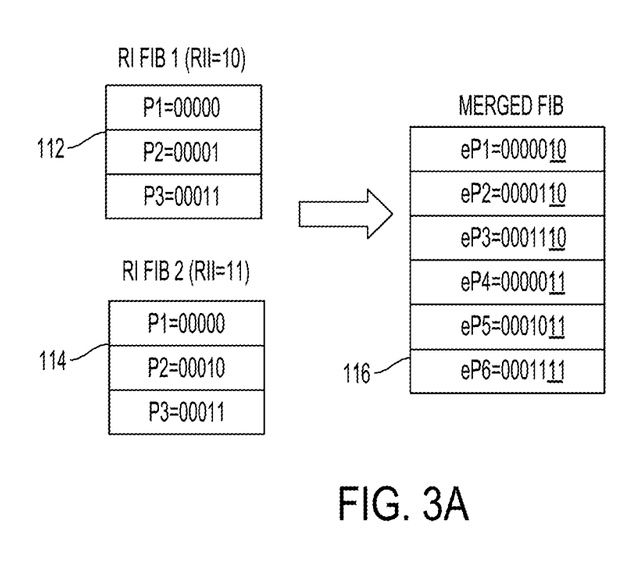
FIG. 3A is a graphical representation of an example method of forming of key entries of a merged FIB.
Figure 3B:
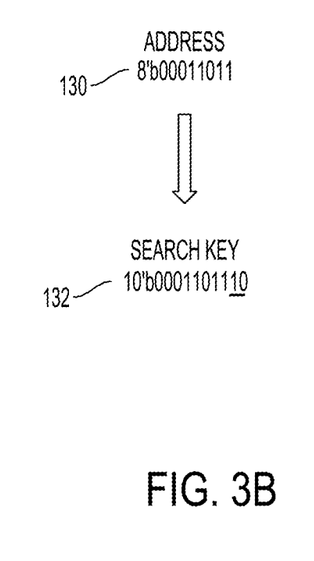
FIG. 3B is a graphical representation an example method of forming a search key to lookup the merged FIB of FIG. 3A.

Turning now to FIG. 3A and FIG. 3B, another encoding scheme is presented. In this encoding scheme, the RII is inserted at the end of the addresses and/or prefixes forming the key entries of the RI FIBs 112, 114, to form the merged FIB 116. The same encoding scheme is used to encode the search key 132. The search key 132 is encoded by inserting the RII at the end of the read data packet destination address 130. It was found that greater efficiency/speed could be achieved at least in some applications by using the encoding scheme of FIGS. 3A and 3B instead of the encoding scheme of FIGS. 1A and 1B. This can be the case in applications where the key entries of the RI FIBs were mostly, or all, host routes (full IP addresses). Indeed, in network switches of data centers, for instance, it is quite common for the key entries of the RI FIBs to be mostly, if not all, complete IP addresses as opposed to prefixes. This can be due to factors such as virtual machine moves, for instance.

Figure 4A:
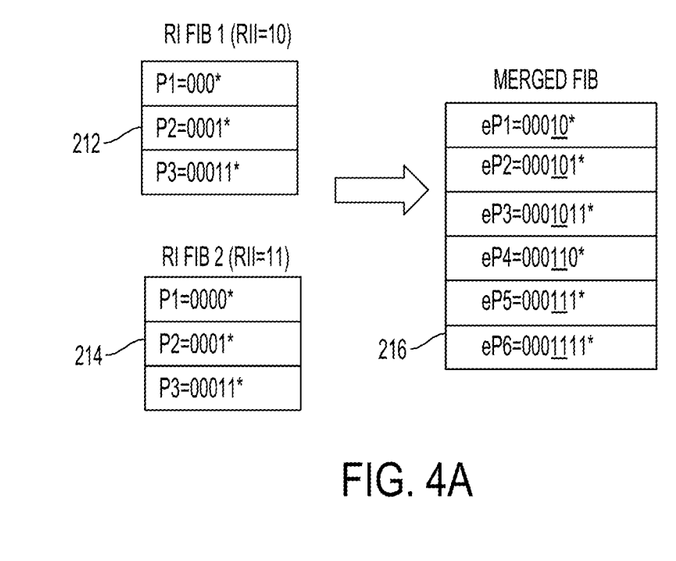
FIG. 4A is a graphical representation of an example method of forming of key entries of a merged FIB.
Figure 4B:
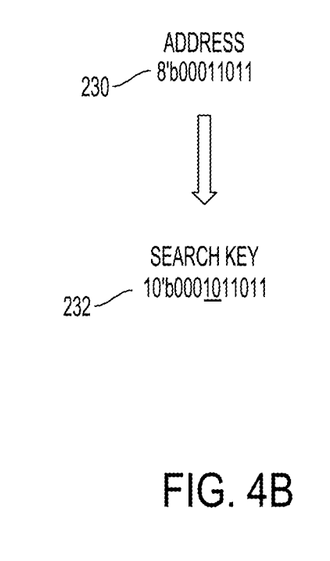
FIG. 4B is a graphical representation an example method of forming a search key to lookup the merged FIB of FIG. 4A.

Turning now to FIGS. 4A and 4B, another encoding scheme is presented. In this encoding scheme, the RI is inserted in an intermediary location of the addresses or prefixes, and more specifically after a common root of the key entries of the RI FIBs 212, 214, to form the merged FIB 216. The same encoding scheme is used to encode the search key 232. The search key 232 is encoded by inserting the RII at an intermediary location of the read data packet destination address 230. In this encoding scheme, the merged FIB creation algorithm can include a step of identifying common roots of the key entries in the RI FIBs 212, 214. The common root can be in the form of common most significant bits (MSBs) of the key entries, for instance. If common roots are found, the value of the number of bits of the common root can be stored in the memory system, and the RII can be inserted into the RI FIB key entries after the number of bits corresponding to the common root. The rest of the bits of the RI FIB key entries then extend after the RII. Then, to lookup the merged FIB 216, a search key 232 can be encoded by looking up the value of the common root in the memory system, and inserting the RII into the destination address of the data packet after the number of bits corresponding to the common root value. Indeed, it was found that in at least some applications where the key entries of the RI FIBs were mostly prefixes as opposed to full IP addresses, the encoding scheme of FIGS. 4A and 4B provided greater efficiency/speed than the encoding schemes of FIGS. 1A and 1B, and of FIGS. 3A and 3B. If no common roots are found (common root of 0 bits), the algorithm can be designed to default on inserting the RII at the beginning of the RI FIB key entries, for instance.

Accordingly, in accordance with a general aspect, there is provided a computer-implemented method of encoding a search key or a merged FIB key entry, wherein the encoded key has an RII after at least a portion of the initial key (e.g. after a common root value or at the end of the initial key). The key to be encoded can be a key entry of an RI FIB, to form an encoded key entry of a merged FIB, or a destination address of a data packet, to form a search key. The encoded key, either in the form of an encoded key entry or in the form of a search key, is typically stored in the memory of the device, but can alternately be stored in another form of memory accessible by the network node.

Figure 5:
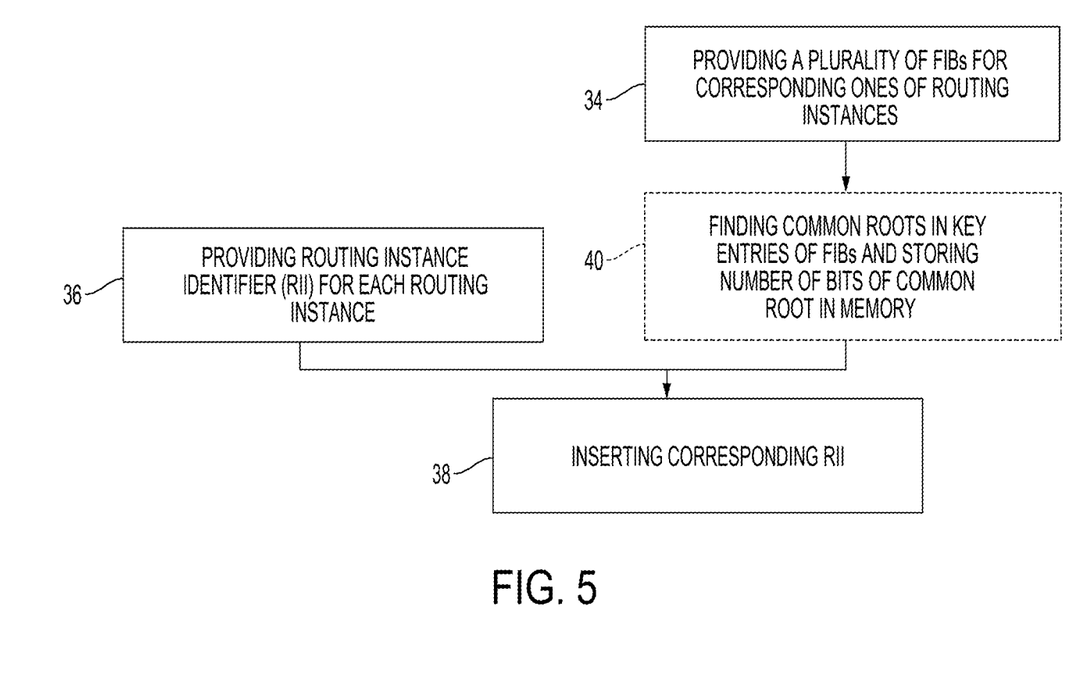
FIG. 5 is a flow chart of a method of forming a merged FIB.

Indeed, with reference to FIG. 5, a method of forming a merged FIB can include, at step 34, providing a plurality of FIBs of corresponding routing instances co-existing on a given device, and, at step 36, providing routing instance identifiers (RII) for each of these FIBs. The method can further include, at step 38, encoding the key entries of the RI FIBs by inserting the RII after at least a portion of the initial key entries. The merged FIB can then consist of the combined entries of the RI FIBs, with the encoded key entries. If the method is used in accordance with the encoding scheme of FIGS. 3A and 3B, an additional step 40 may be introduced, involving finding a common root of the key entries and storing the value of the number of bits of the common root in a memory for use during step 38 of encoding the key entries or later in step 48 of encoding the search key.

Figure 6:
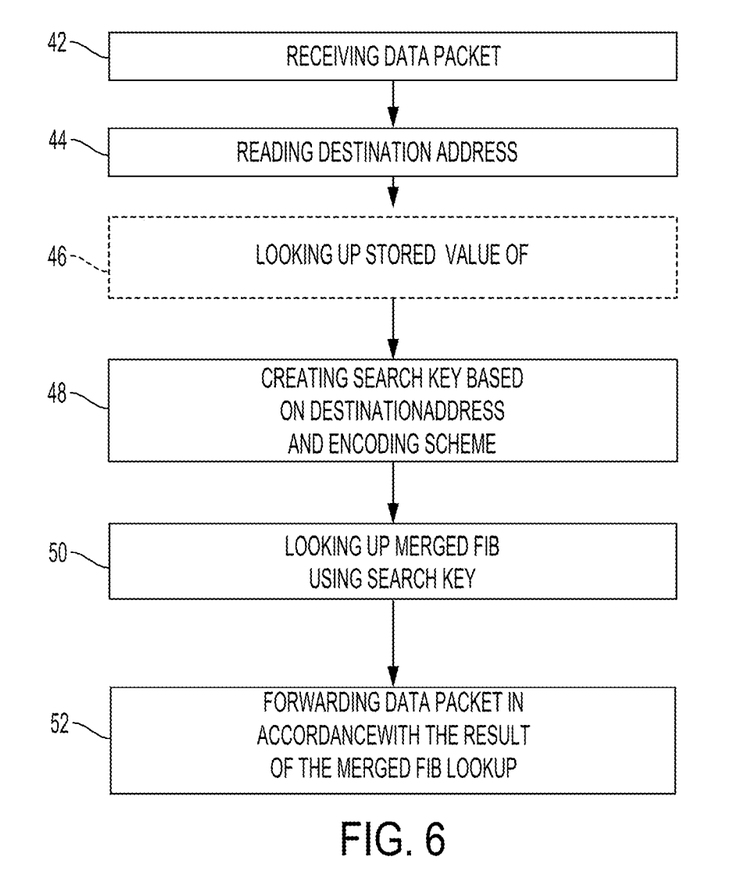
FIG. 6 is a flow chart of a method of looking up a merged FIB.

With reference to FIG. 6, a method of forwarding a data packet can include, at step 42, receiving the data packet; at step 44, reading a destination address of the data packet; at step 48, creating the search key by encoding the destination address based on the encoding scheme; at step 50, looking up the merged FIB using the search key; and, at step 52, forwarding the data packet in accordance with the result of the lookup. Indeed, the encoded key entries of the merged FIB can have forwarding information associated therewith, which directs the forwarding of the data packet via the appropriate output port. It will be noted that here also, if the method is used in accordance with the encoding scheme of FIGS. 3A and 3B, an additional step 46 can be performed, involving looking up the value of the number of bits of the common root to determine how to encode the destination address.

Example Embodiments Using Multiple Trie Lookup Algorithms

Various forms of longest prefix match (LPM) lookup algorithms exist. A hash function is one example. The unibit trie is another example. In the unibit trie, the algorithm checks the bits one at a time for a matching prefix until it reaches a 'dead end'. The dead end can be a bit corresponding to a given prefix length for which the value does not match any longer key entry in the table. Another longest prefix matching algorithm is the multibit trie in which the bits are checked by groups of fixed or variable size referred to as strides in an attempt to gain speed over the unibit trie. The selection of a stride size can be based on a trade-off between memory accesses and space requirements. Several variants of such algorithms exist.

On-chip search engines are generally used for devices such as data center switches and routers, as search throughput of network processing units (NPUs) can significantly exceed the speed of off-chip memory. Multibit trie algorithms have been used in the past as a satisfactory solution to longest prefix match lookups in such applications. However, when applied to merged FIBs of virtual networks now widely used in software defined networking (SDN) and network function virtualization (NFV), the efficiency of multibit trie algorithms can be limited, at least in applications where the multibit trie is sparsely populated, as sparsely populated multibit tries are relatively costly in terms of on-chip resources. An approach making the multibit trie less sparsely populated was sought.

Figure 7:
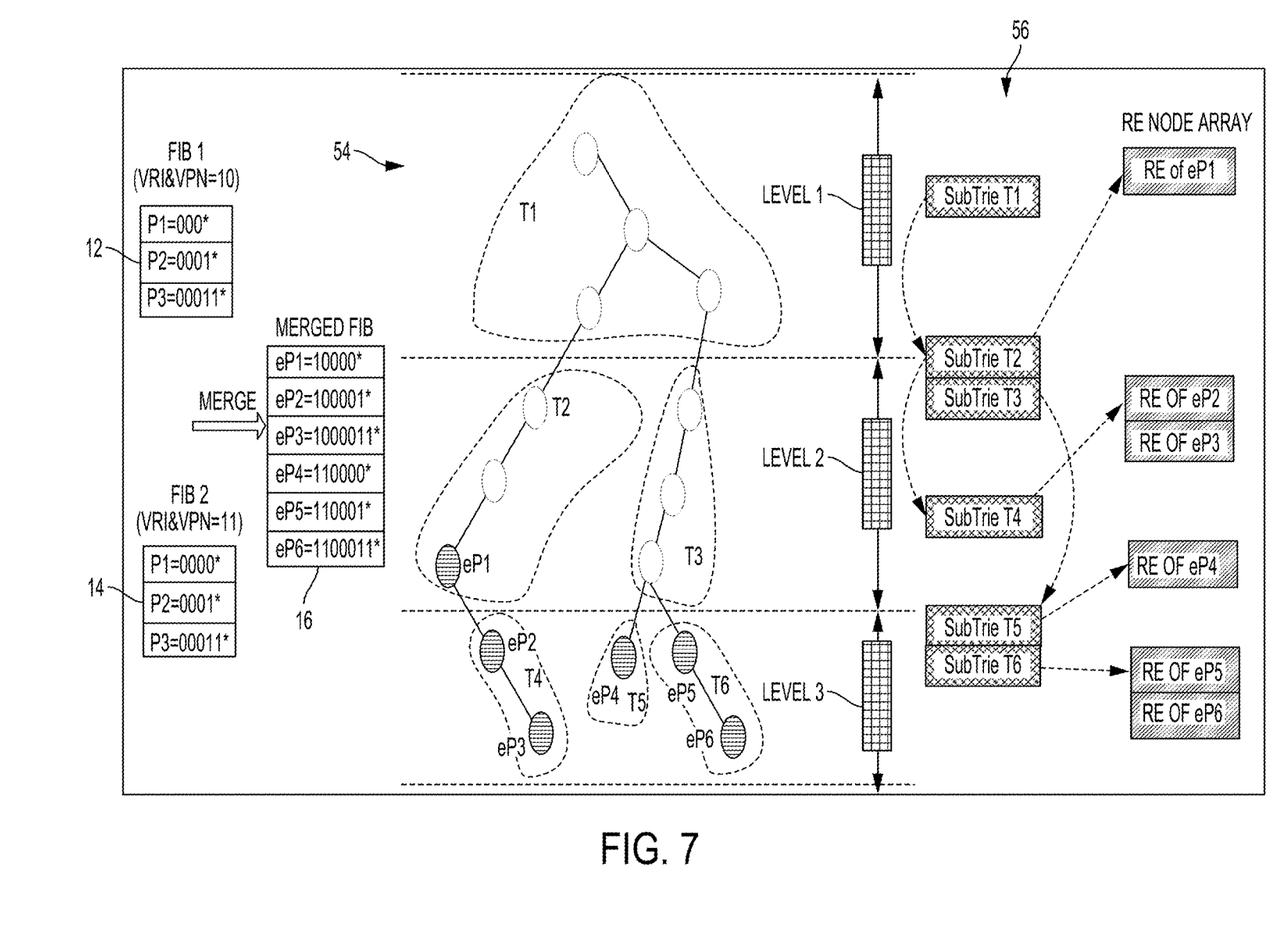
FIG. 7 is a graphical representation of a multibit trie algorithm looking up the merged FIB of FIG. 1A.

Indeed, FIG. 7 shows an example multibit trie algorithm based on the example key encoding scheme presented in FIGS. 1A and 1B. In this algorithm, a shared binary trie 54 is created to represent the merged FIB, and a multi-bit-trie-based algorithm 56 is run on the trie to implement LPM lookup.

A shared binary trie 54 is created to represent the merged FIB. The shared binary trie is divided into sub-tries T1-T6 according to a stride size of 3. A sub-trie is characterized by prefixes contained within the sub-trie, its child sub-tries, and pointer to a Rout Entry (RE) node array, where an RE node array stores next-hop information for prefixes within a sub-trie. Various encoding schemes, such as internal bitmap for prefixes and external bitmaps for child sub-tries, can be used to encode a sub-trie.

To lookup address 8'b00011011 that belongs to FIB 1, a search key 10'b1000011011 is created by prepending it with RII of 10. The root sub-trie T1 is checked first against the first stride 100. There is no prefix match in T1, and child sub-trie T2 is chosen. Then the second stride 001 is checked against sub-trie T2, and a match with eP1 is found. Accordingly, eP1 is recorded as the current LPM, and child sub-trie T4 is chosen. Lastly, the third stride 101 is checked against sub-trie T4, and two matches are found: eP2 and eP3. As eP3 has longer length than eP2, eP3 is chosen as the LPM for this stride. Since eP3 has longer length than the current LPM eP1, eP3 is chosen as the final LPM.

There are two shortcomings for the above approach. First, all prefixes in RI FIB 12 and RI FIB 14 share the same 3 Most Significant Bits (MSBs) 000, and this is not used to achieve higher memory utilization. Secondly, compared with the original FIBs such as FIB 12 and FIB 14, the merged FIB becomes sparser. Sparse tries can render bitmap encoding inefficient, which, in turn, can lead to lower memory efficiency.

Figure 8:
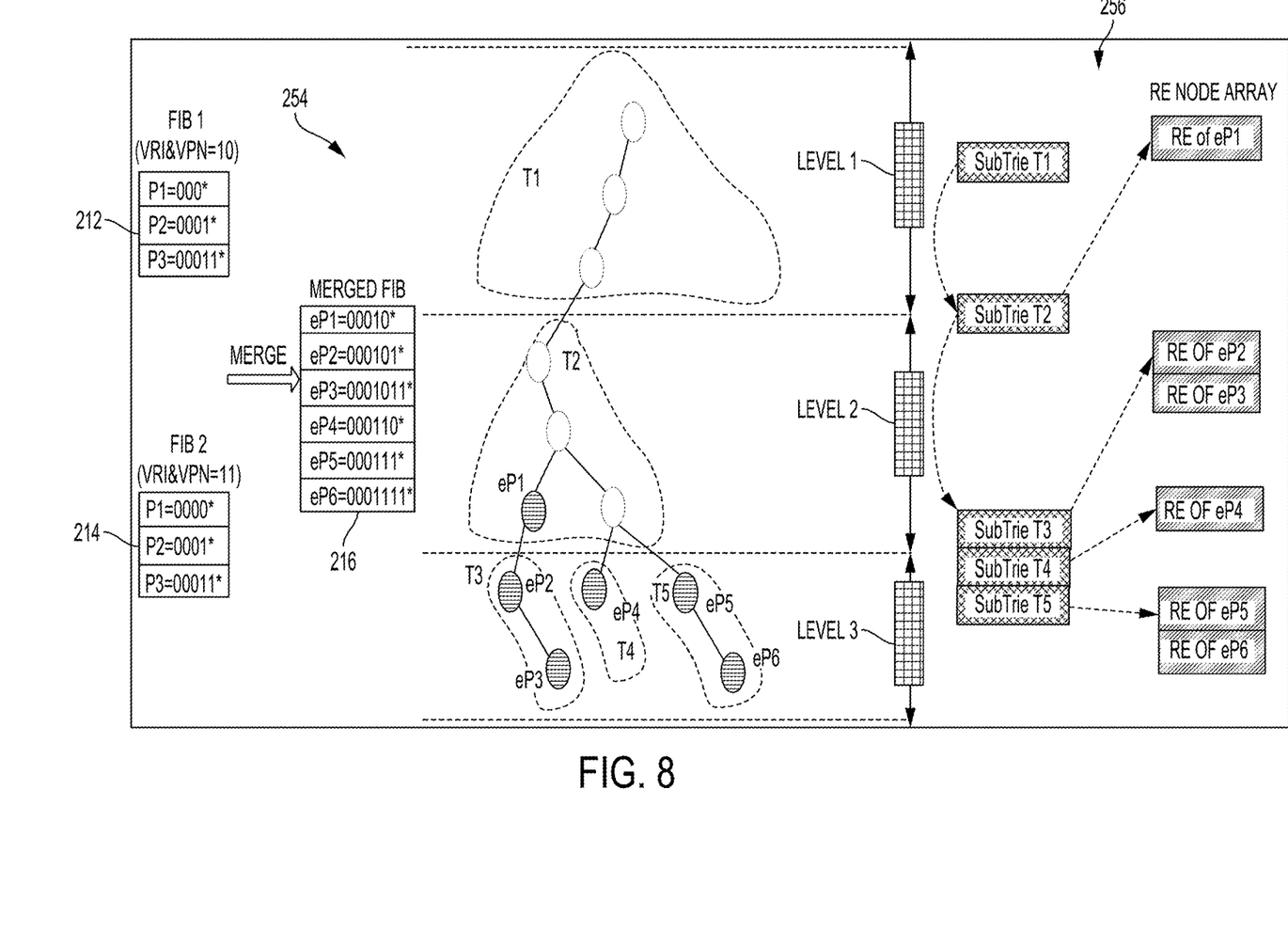
FIG. 8 is a graphical representation of a multibit trie algorithm looking up the merged FIB of FIG. 4A.

FIG. 8 shows another example multibit trie algorithm 256 applied to the same RI FIBs 212, 214, but encoded in accordance with the key encoding scheme shown in FIGS. 4A and 4B. Here, the RI FIBs are read and a common root of 3 MSBs is found. The corresponding RII is inserted after the common root. A shared binary trie 254 is created to represent the merged FIB. The shared binary trie is divided into sub-tries T1-T5 according to a stride size of 3.

To lookup address 8'b00011011 that belongs to RI FIB 1, a search key 10'b0001011011 is created by inserting it with RII of 10 after the common root of 000. The root sub-trie T1 is checked first against the first stride 000. There is no prefix match in T1, and child sub-trie T2 is chosen. Then the second stride 101 is checked against sub-trie T2, and a match with eP1 is found. Accordingly, eP1 is recorded as the current LPM, and child sub-trie T3 is chosen. Lastly, the third stride 101 is checked against sub-trie T3, and two matches are found: eP2 and eP3. As eP3 has longer length than eP2, eP3 is chosen as the LPM for this stride. Since eP3 has longer length than the current LPM eP1, eP3 is chosen as the final LPM.

For emerging Software Defined Networks (SDN) and Network Function Virtualization (NFV), each customer is assigned a Virtual Network, where resources allocated to a Virtual Network include a set of virtual machines and an IP address block. There are two standard IP address formats, an IPv4 address format with a length of 32 bits, and an IPv6 address format with a length of 128 bits. Typically, private IPv4 or IPv6 addresses are used for the IP address block assignment, and a virtual machine is assigned a private IPv4 or IPv6 address. As an example, a customer A can be assigned an IPv4 address block of 192.168/16, where /16 means that all customer A's addresses has the same 16 bit prefix 192.168, and another customer B can be assigned an IPv4 address block of 192.168.20/24. Here, 192.168/16 and 192.168.20/24 are called prefix roots for customers A and B, respectively. As these two customers have overlapping IPv4 address blocks, they must be assigned different RIIs for proper routing.

For IPv4, there are three private address spaces: 10/8, 172.16/12, and 192.168/16. For IPv6, many private address spaces are available, where a private address space is identified by a 7 bit fixed prefix plus a 40 bit global ID. A customer is assigned an address block within a private address space.

The above FIB merging shown in FIG. 8 can be extended to cover multiple private address spaces defined for both IPv4 and IPv6. This can be done in accordance with the following steps:

A. within each private address space, find the shared MSBs among FIBs in the private address space, and these shared MSBs are defined as common roots of these FIBs;

B. a prefix in a VR or VPN FIB is extended by inserting RII (VRI or VPNI) immediately after the common root;

C. a merged FIB for the private address space is generated from the set of extended prefixes from all VRs and VPNs assigned to the private address space;

D. merged FIBs from all private address spaces are aggregated into one larger merged FIB;

E. a trie is created for the (overall) merged FIB; and

F. an efficient multi-bit-trie-based algorithm is run on the trie to implement an LPM lookup.

Figure 9:
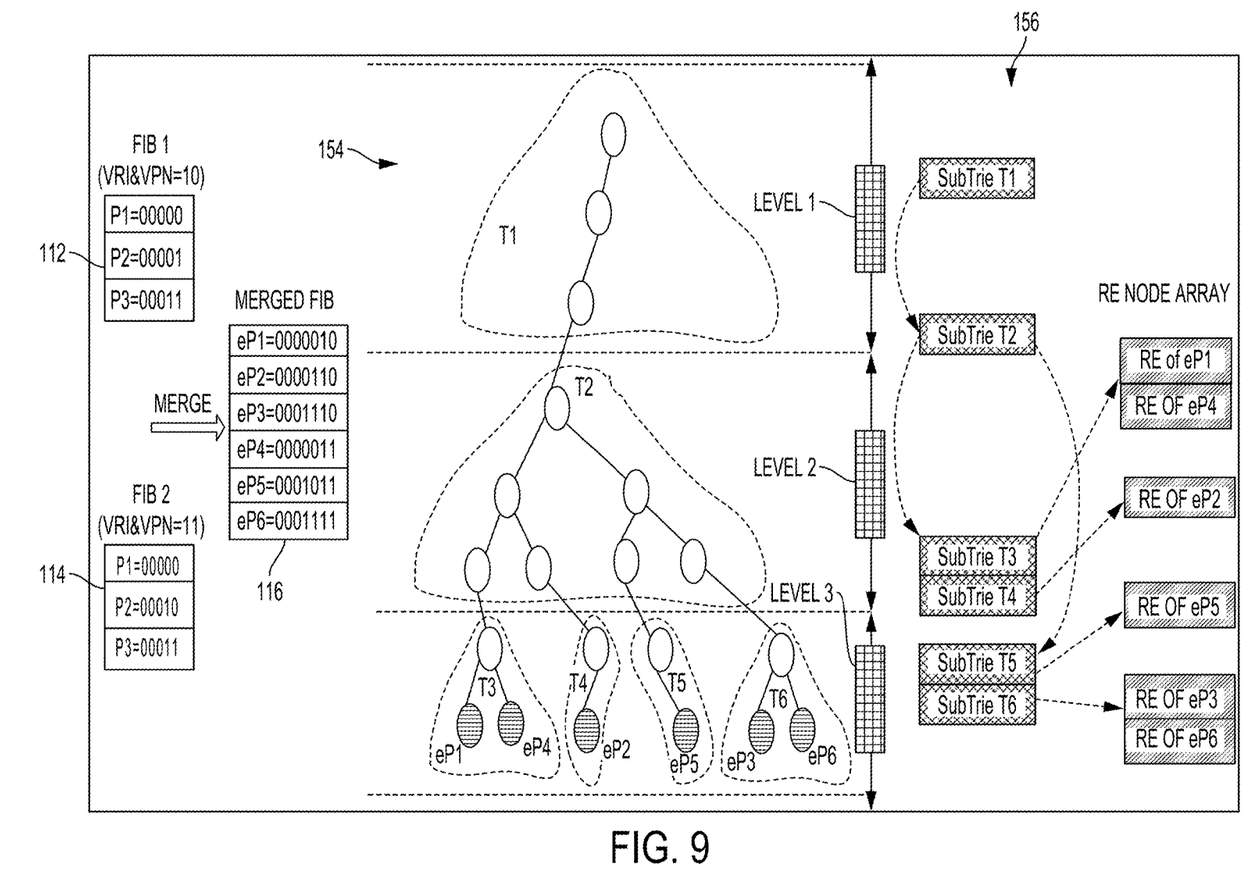
FIG. 9 is a graphical representation of another multibit trie algorithm looking up the merged FIB of FIG. 3A.

Turning now to FIG. 9, another example multibit trie algorithm 156 is shown. In this example, the multibit trie algorithm 156 is applied to the context of a key encoding scheme of FIGS. 3A and 3B. Regardless of private address spaces, a host route is extended by appending the RII immediately after the host route.

A merged FIB 116 is generated from the set of extended host routes from all routing instances (such as VPNs or VRs). A merged trie 154 is created to represent the merged FIB 116.

In the scenario shown in FIG. 7, even though FIB 12 and FIB 14 share the same host routes P1-P3, their extended host routes eP1 and eP4 as well as eP3 and eP6 were very far apart from each other in the merged FIB, which limits memory efficiency.

By appending the RII after the host route, for the host route P1 shared by FIB 112 and FIB 114, their extended host routes eP1 and eP4 are very close to each other, in the same subtrie T3 of the merged FIB 116. Similarly, for the host route P3 shared by FIB 112 and FIB 114, their extended host routes eP3 and eP6 are very close to each other, in the same subtrie T6 of the merged FIB 116. As a result, higher memory efficiency is achieved in the merged FIB 116.

Indeed, in modern data centers, most entries in a FIB are host routes due to virtual machine moves, where a host route is assigned to a single host and has a length of 32 bits or 128 bits for IPv4 or IPv6, respectively. As all host routes for a given address format have the same length.

Figure 10:
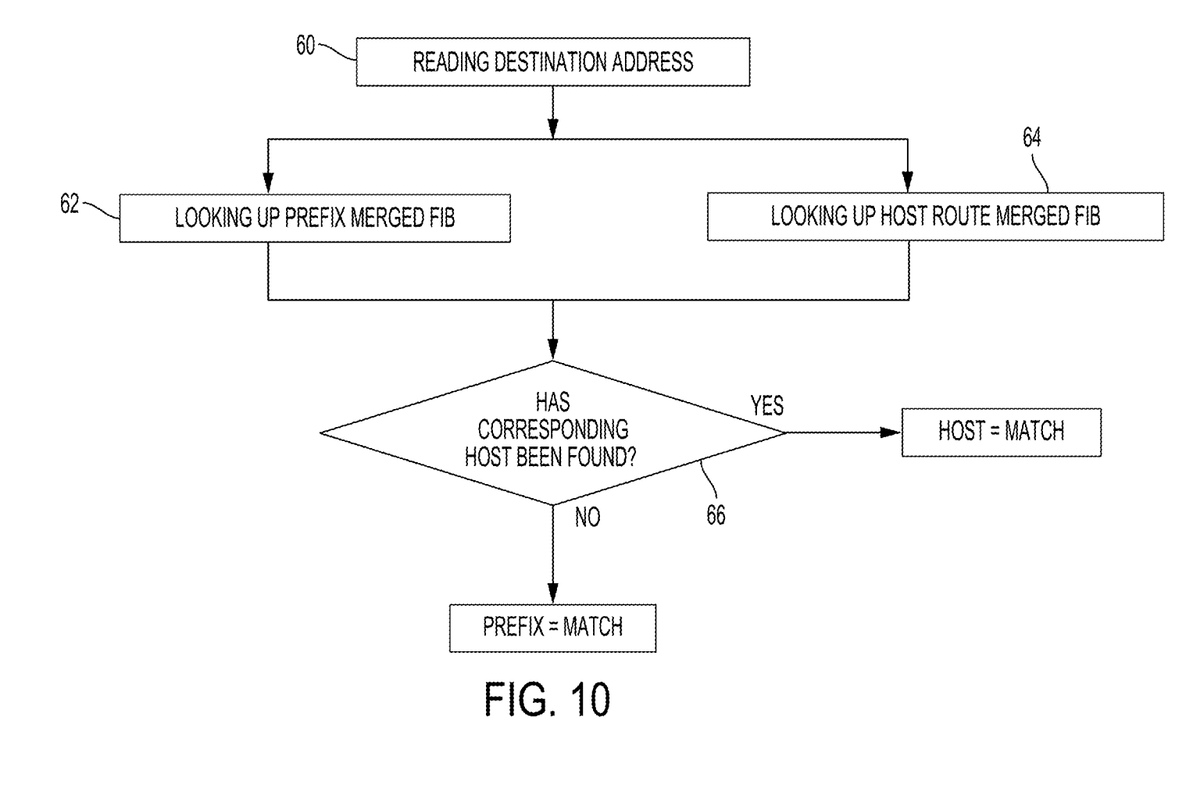
FIG. 10 is a flow chart of a method of looking up two complementary merged FIBs in parallel.

Referring to FIG. 10, in a more evolved approach, prefix keys and IP address (or host route) keys can be encoded differently into separate, partial, merged FIBs, and the separate FIBs can be looked up separately at steps 62 and 64, in parallel, after reading the destination address at step 60. The results of the IP address lookup can be given priority in a manner that the prefix key lookup result is treated as a match only if, at step 66, the IP address key lookup has failed to identify a result.

Figure 11:
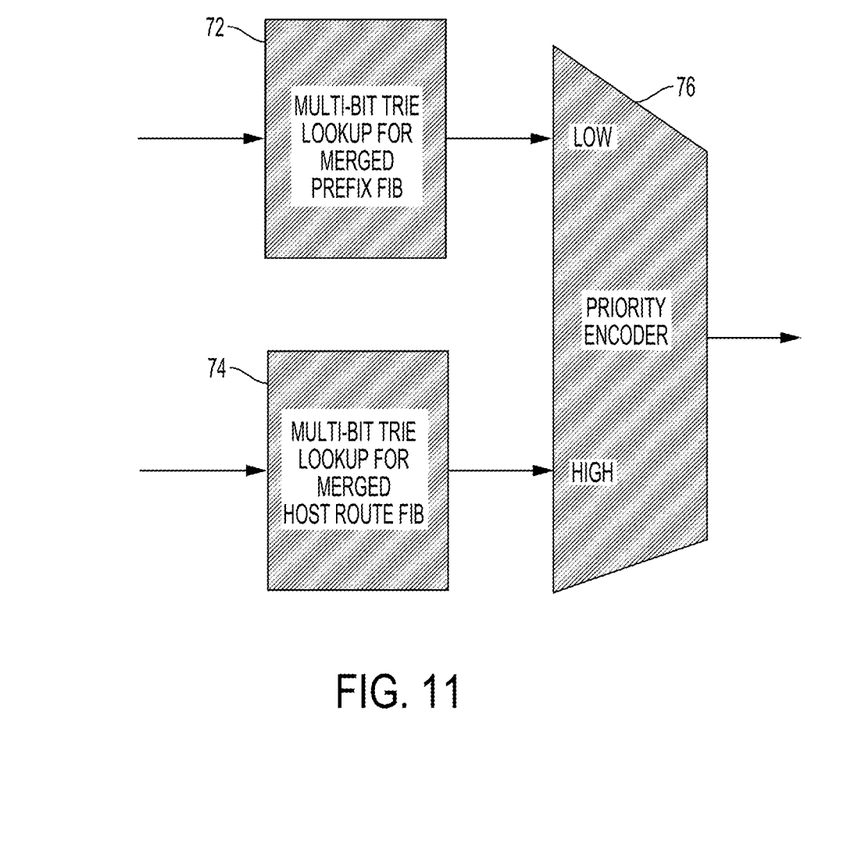
FIG. 11 is a block diagram of a system for performing the method of FIG. 10.

Indeed, for IP lookups of virtual networks two multi-bit merged tries can be generated, one for prefix RI key entries in which the RII is inserted after a common root, and another one for host route key entries in which the RII is appended to the host route. Such an embodiment is illustrated in FIG. 11.

Here, two parallel multi-bit trie lookup functions 72, 74 are performed, one for merged prefix FIB 72, the other for merged host route FIB 74. A priority encoder 76 is used to select the best match among the parallel lookup results, where the results from the merged host route FIB are given higher priority. If a match is found from the merged host route FIB function 74, the match is selected as the final LPM match, otherwise, the match from the merged prefix FIB lookup function 72 is selected as the final LPM match.

Indeed, simulations have demonstrated that for IPv4 using address block of 192.168/16, the solution can provide more than 30% in memory savings, whereas in a private address block scenario under IPv6, the solution can provide memory savings up to 50%.

As can be understood, the examples described above and illustrated are intended to be exemplary only. For instance, the methods presented above can be applied to processor chips for servers or other applications having similar search engine capabilities where key entries having an address format need to be looked up for matching. The key encoding scheme can be applied to other forms of lookup algorithms, such as search tree-based algorithms. The scope is indicated by the appended claims.

What is claimed is:

1. A method of creating a key entry of a merged forwarding information base (FIB) for at least two routing instances (RI) on a network node, each RI having a corresponding RI FIB with corresponding RI FIB key entries and a corresponding routing instance identifier (RII), the method comprising:
   inserting a corresponding RII after at least a portion of a corresponding RI FIB key entry;
   identifying a common root in a plurality of the RI FIB entries, wherein the merged FIB key entries have the corresponding RII immediately after the common root of the corresponding RI FIB key entries.

2. The method of claim 1 wherein the RII is inserted at the end of the corresponding RI FIB key entry.

3. The method of claim 1 wherein the RII is inserted between two portions of the corresponding RI FIB key entry.

4. The method of claim 1 further comprising repeating the step of inserting on all the RI FIB key entries to create other merged FIB key entries, creating the merged FIB using all the merged FIB key entries.

5. The method of claim 1 further comprising storing a value of the common root in a memory.

6. The method of claim 5 further comprising creating a search key by inserting the corresponding routing instance identifier in a destination address of a data packet to be routed after a number of bits corresponding to the value of the common root.

7. A method of creating a search key for at least two routing instances (RI) on a network node sharing a merged forwarding information base (FIB) having key entries, each RI having a corresponding routing instance identifier (RII), the key entries of the merged FIB each including a corresponding one of the RIIs, the method comprising:
   inserting a corresponding RII after at least a portion of a destination address of a data packet to be routed by the network node; and
   retrieving a value of a common root from a memory, wherein the RII is inserted after a number of bits of the destination address corresponding to the value of the common root.

8. The method of claim 7 wherein the RII is inserted at the end of the destination address.

9. The method of claim 7 wherein the RII is inserted between two portions of the destination address.

10. A method of forwarding a data packet with a network node having at least two routing instances (RIs) sharing a merged forwarding information base (FIB), the merged FIB having key entries provided in a format including a routing instance identifier (RII) after at least a portion of a data packet address, in accordance with an encoding scheme, the method comprising:
    receiving the data packet;
    reading a destination address in the data packet;
    creating a search key by inserting a corresponding RII after at least a portion of the destination address, in accordance with the encoding scheme, wherein creating the search key includes inserting the RII after a number of bits of the destination address corresponding to the value of a common root of a plurality of key entries of FIBs of the routing instances;
    selecting an output port for the data packet including looking up the merged FIB using the search key; and
    forwarding the data packet via the selected output port.

11. The method of claim 10 further comprising
    identifying at least one common root of a plurality of key entries of FIBs of the routing instances, and
    storing at least one corresponding common root value in a memory.

12. The method of claim 11 wherein the identifying includes identifying at least one common root of a plurality of key entries of a plurality of FIBs in a same private address space.

13. The method of claim 11, wherein the identifying includes identifying a plurality of common roots in key entries of a plurality of FIBs in different private address spaces.

14. The method of claim 13, wherein the common roots have the same length.

15. The method of claim 14 wherein at least some of the common roots have a different length.

16. The method of claim 10 wherein looking up the merged FIB includes performing a multibit trie algorithm.

* * * * *